(12) United States Patent
Bergerson et al.

(10) Patent No.: US 12,110,976 B2
(45) Date of Patent: Oct. 8, 2024

(54) VALVES AND VALVE ASSEMBLIES

(71) Applicant: Relativity Space, Inc., Long Beach, CA (US)

(72) Inventors: Eliott Bergerson, Long Beach, CA (US); Peiran Ding, Long Beach, CA (US); Steven Ko, Long Beach, CA (US); Nicholas Feenstra, Long Beach, CA (US); Aaron Jesse Fillo, Long Beach, CA (US); Joshua Percival Kaye, Long Beach, CA (US); Benjamin Xavier Schleuniger, Long Beach, CA (US)

(73) Assignee: Relativity Space, Inc., Long Beach, CA (US)

( * ) Notice: Subject to any disclaimer, the term of this patent is extended or adjusted under 35 U.S.C. 154(b) by 15 days.

(21) Appl. No.: 18/176,955

(22) Filed: Mar. 1, 2023

(65) Prior Publication Data

US 2024/0183458 A1 Jun. 6, 2024

Related U.S. Application Data

(60) Provisional application No. 63/386,093, filed on Dec. 5, 2022.

(51) Int. Cl.
*F16K 15/06* (2006.01)
*F16K 17/04* (2006.01)
*F16K 27/02* (2006.01)

(52) U.S. Cl.
CPC ........ *F16K 17/0493* (2013.01); *F16K 15/064* (2021.08); *F16K 15/065* (2021.08);
(Continued)

(58) Field of Classification Search
CPC ........... F16K 27/0209; F16K 2200/305; F16K 2200/502; F16K 17/0493; F16K 15/064; F16K 15/065
See application file for complete search history.

(56) References Cited

U.S. PATENT DOCUMENTS

| | | | |
|---|---|---|---|
| 3,800,824 A * | 4/1974 | Medina | F16K 15/065 137/543 |
| 6,695,007 B2 * | 2/2004 | Vicars | F16K 17/04 137/543 |

(Continued)

*Primary Examiner* — P. Macade Nichols
(74) *Attorney, Agent, or Firm* — Sterne, Kessler, Goldstein & Fox P.L.L.C.

(57) ABSTRACT

A valve assembly has a housing and a poppet-carrying portion. The housing includes an inlet port, an outlet port, an opening, and a assembly portion including helical grooves. The poppet-carrying portion is configured to be inserted through the opening and engage with the assembly portion. The poppet-carrying portion comprises a poppet head, a closure including protruding arms, convolutions, and a stopping portion. The convolutions extend between the poppet head and the closure and provide compliance such that the poppet head is movable relative to the closure. The stopping portion extends from the closure toward the poppet head and is spaced apart from the poppet head by a maximum compression distance. At a first fluid pressure, the protruding arms engage with the helical grooves, and the poppet head is positioned in a pre-load position that prevents the fluid from discharging through the outlet port.

20 Claims, 8 Drawing Sheets

(52) U.S. Cl.
CPC .... *F16K 27/0209* (2013.01); *F16K 2200/305* (2021.08); *F16K 2200/502* (2021.08)

(56) References Cited

U.S. PATENT DOCUMENTS

| | | | |
|---|---|---|---|
| 11,125,347 B1* | 9/2021 | Laible | F16K 15/182 |
| 2009/0126575 A1* | 5/2009 | Son | F01M 13/0011 |
| | | | 96/189 |
| 2021/0404568 A1* | 12/2021 | Surjaatmadja | F16K 15/028 |

* cited by examiner

VALVES AND VALVE ASSEMBLIES

BACKGROUND

Technical Field

The present disclosure relates to valves and valve assemblies. More specifically, embodiments of this disclosure relate to the structure of an additively manufactured, integrally formed, valve for controlling fluid flow.

Background

Valves are used to regulate, direct, and control fluid flow. Valves are generally manufactured in multiple parts. For example, a conventionally manufactured check valve includes seven to nine individual parts that are joined to create a check valve assembly.

SUMMARY

The present disclosure can comprise one or more of the following features and combinations thereof. The descriptions herein represent non-limiting invention embodiments.

According to an embodiment of the present disclosure, a valve assembly may include a housing and a poppet-carrying portion. In some embodiments, the housing may comprise an inlet port, outlet port, and an assembly portion. In some embodiments, the inlet port may be at a first end of the housing and receive fluid. In some embodiments, the outlet port may be for discharging fluid and may be spaced from and substantially perpendicular to the inlet port. In some embodiments, the assembly portion may be positioned distal from the inlet port and comprise an opening and helical grooves. In some embodiments, the opening is configured to receive the poppet-carrying portion when assembling the valve assembly and may be at a second end of the housing. In some embodiments, the poppet-carrying portion can be configured to be inserted through the opening and engage with the assembly portion of the housing.

In some embodiments, the poppet-carrying portion may comprise a poppet head, a closure, at least one convolution, and a stopping portion. In some embodiments, the poppet head may be at a first end of the poppet-carrying portion and configured to engage the housing to seal the inlet port from inside the housing when the fluid is at a first pressure. In some embodiments, the poppet head may be displaced, such that the inlet port is connected to the outlet port when the fluid is at a second pressure, wherein the second pressure is greater than the first pressure.

In some embodiments, the closure may be at a second end of the poppet-carrying portion and include a plurality of protruding arms. In some embodiments, the plurality of protruding arms may be configured to engage with the helical grooves of the housing. In some embodiments, engagement of the plurality of protruding arms with the helical grooves may lock the poppet-carrying portion with the housing such that the poppet head engages with the housing to seal the inlet port.

In some embodiments, the at least one convolution may extend between the poppet head and the closure. In some embodiments, the at least one convolution may be configured to compress and provide compliance such that the poppet head is movable relative to the closure. In some embodiments, the stopping portion may extend from the closure toward the poppet head and may be spaced apart from the poppet head. In some embodiments, the stopping portion may be configured to limit compression of the at least one convolution and movement of the poppet head such that at maximum compression of the at least one convolution, the poppet head and the closure are separated by a distance equal to a length of the stopping portion.

In some embodiments, the at least one convolution may comprise a first end, a second end, a first compliant portion, a second compliant portion, and a third compliant portion. In some embodiments, the first compliant portion may extend outwardly away from the first end at a first angle relative to a longitudinal axis extending from the first end to the second end. In some embodiments, the third compliant portion may extend outwardly away from the second end at a second angle relative to the longitudinal axis. In some embodiments, the second compliant portion may be between and coupled to distal ends of the first compliant portion and the third compliant portion. In some embodiments, the first angle and the second angle may be between about 30 degrees and about 80 degrees.

Further features and advantages, as well as the structure and operation of various embodiments, are described in detail below with reference to the accompanying drawings. It is noted that the specific embodiments described herein are not intended to be limiting. Such embodiments are presented herein for illustrative purposes only. Additional embodiments will be apparent to persons skilled in the relevant art based on the teachings contained herein.

BRIEF DESCRIPTION OF THE DRAWINGS

The accompanying drawings, which are incorporated herein and form a part of the specification, can illustrate embodiments of the present disclosure and, together with the description, further serve to explain the principles of the disclosure and to enable a person skilled in the pertinent art to make and use the disclosure.

DETAILED DESCRIPTION

Figure 1:
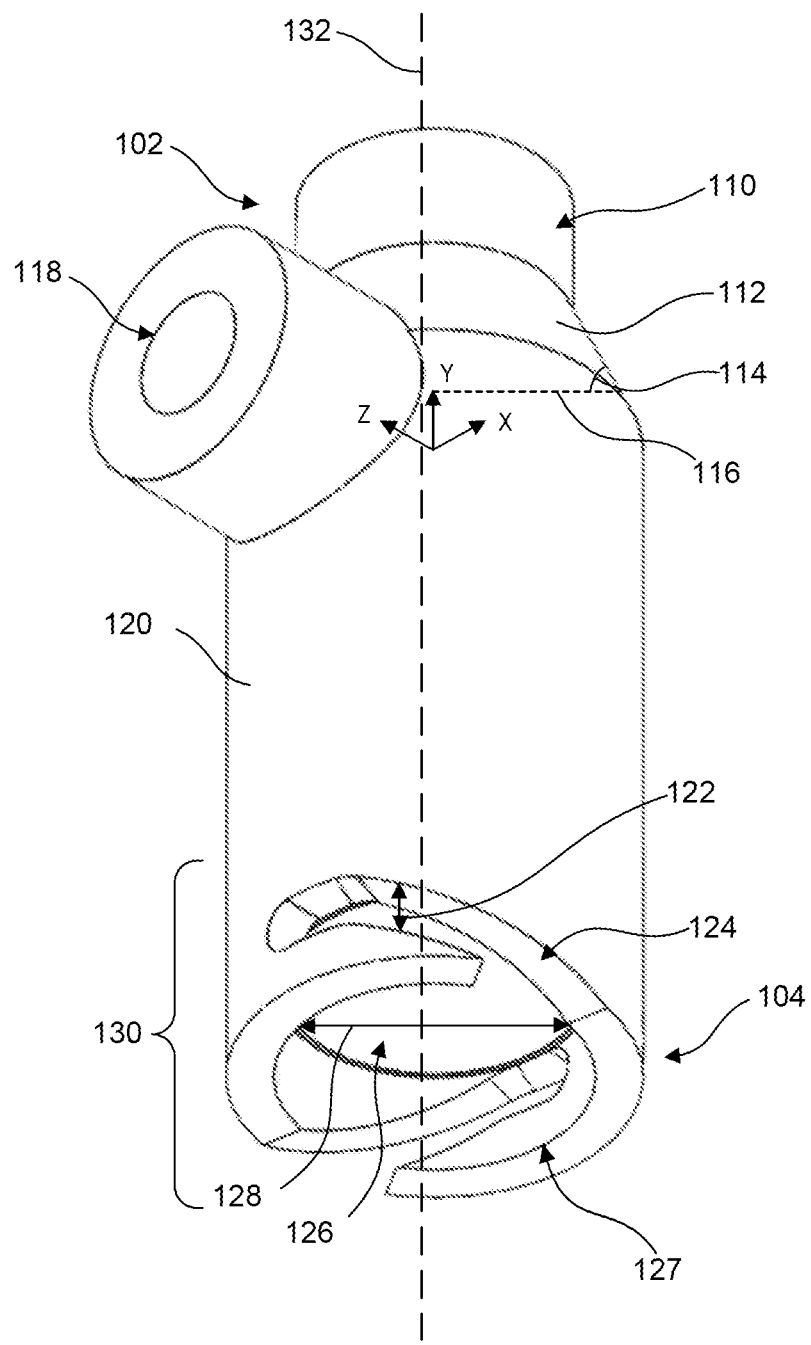
FIG. 1 illustrates a perspective view of a housing of a valve assembly with an outlet port extending outwardly from the housing, according to an embodiment of the present disclosure.

In some embodiments of the present disclosure, the terms "about" and "substantially" can indicate a value of a given quantity that varies within 20% of the value (e.g., ±1%, ±2%, ±3%, ±4%, ±5%, ±10%, ±20% of the value). These values are examples and are not intended to be limiting. The terms "about" and "substantially" can refer to a percentage of the values as interpreted by those skilled in relevant art in light of the teachings herein.

Further, spatially relative terms, such as "beneath," "below," "lower," "above," "upper," and the like, may be used herein for ease of description to describe one element or feature's relationship to another element or feature as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Additive manufacturing, such as Laser Powder Bed Fusion (LPBF), allows a user to create a complex object from a CAD model. The CAD model can be input into a 3-D printer, and the printer can form parts with the user's desired shapes. The additive manufactured parts are formed by building up structural layers and fusing them together. To start the process, the print chamber is filled with inert gas and heated to a desired printing temperature. A thin layer of a powdered material is applied to the build platform and a focused energy source (e.g., a fiber optic laser) scans the cross-section of the part and melts the metal particles together. When the first layer is finished, the platform can move downward, allowing the next layer of powder to be added, melted, and fused to the first layer. The process is repeated until the final part is obtained. The powdered raw material can be polymers or metals such as stainless steel, cobalt-chromium, aluminum, titanium, Inconel, or other suitable metals. LPBF additive manufacturing allows 3-D printed components to be made with tight tolerance and thin walls. For example, geometries of the present disclosure can have wall thicknesses between about 0.3 mm to about 2 mm.

The inventors realized that additive manufacturing can be advantageous in manufacturing a valve assembly and realized that it allows for production of a wide array of 3-D shapes that have not been previously achieved, and in fact cannot be achieved, using conventional manufacturing methods. For example, conventional poppet valve assemblies require a helical spring component to provide compliance. Using additive manufacturing methods, however, the conventional helical spring can be replaced with biasing convolutions that are integrally formed with the poppet-carrying portion of the valve assembly, a unitary configuration that cannot be replicated using conventional manufacturing techniques. The bias of the convolutions exerts a force in the direction of the inlet. In this disclosure, the terms "additive manufacturing" and "3-D printing" are used interchangeably.

The present disclosure describes inventive valve structures that leverage additive manufacturing and minimize the number of parts in a valve assembly. Embodiments of the present disclosure will be described with reference to the accompanying drawings.

Example Check Valve Embodiments

FIG. 1 illustrates a perspective view of a housing configuration 100, according to some embodiments. Housing 100 may comprise housing wall 120, inlet port 110, outlet port 118, valve chamber 126, and assembly portion 130. Assembly portion 130 may be disposed at a second end 104 of housing 100 and include helical grooves 124 formed in the housing wall 120 configured to couple with poppet-carrying portion 200. Assembly portion 130 may also be referred to as locking portion of housing 100. In at least one embodiment, housing wall 120 can be 3-D printed to include helical grooves 124 having a width 122. Alternatively, helical grooves 124 may be cut (or otherwise formed into) into housing wall 120. While FIG. 1 depicts housing 100 comprising two helical grooves 124, in some embodiments, housing 100 may include three or more helical grooves 124. Housing 100 may be integrally formed using additive manufacturing methods. This serves to limit part count.

Housing wall 120 may extend around longitudinal axis 132, forming a tube as shown in FIG. 1. The hollow portion inside the tube formed by housing wall 120 may be a valve chamber 126 with an opening 127 formed through the assembly portion 130 at the second end 104 of housing 100. The valve chamber 126 may have a diameter 128, which may be configured such that the poppet-carrying portion 200 may fit into, and may be assembled inside of, valve chamber 126 to form the valve assembly (not shown in FIG. 1). Inlet port 110 may be disposed at a first end 102 and include an opening at the top of housing 100 as shown in FIG. 1. Inlet port 110 may have an internal diameter less than valve chamber diameter 128. In some embodiments, the thickness of the wall around inlet port 110 may be greater than the thickness of housing wall 120 around valve chamber 126. Inlet port 110 may be coupled to an adjacent component and receive fluid from the coupled adjacent component (not shown in FIG. 1). In some embodiments, inlet port 110 may be integrally formed with an adjacent component.

Angled wall portion 112 may extend between housing wall 120 and inlet port 110. Angled wall portion 112 may extend at a wall angle 114 relative to radial axis 116, where radial axis 116 is perpendicular to longitudinal axis 132. Wall angle 114 may be between about 30 degrees and about 80 degrees. Similar to the other portions of housing wall 120, angled wall portion 112 may extend around longitudinal axis 132. Because angled wall portion 112 extends at wall angle 114 relative to radial axis 116, however, it forms a partial cone as shown in FIG. 1.

Outlet port 118 may extend outwardly away from housing wall 120 approximately perpendicular to longitudinal axis 132 and may form a tube as shown in FIG. 1. Outlet port 118 may include an opening formed therethrough and in fluid communication with the valve chamber 126. Fluid may be discharged through outlet port 118. In some embodiments, outlet port 118 may be coupled to an adjacent component that may receive fluid discharged from outlet port 118. In some embodiments, outlet port 118 may be integrally formed with an adjacent component.

Figure 2:
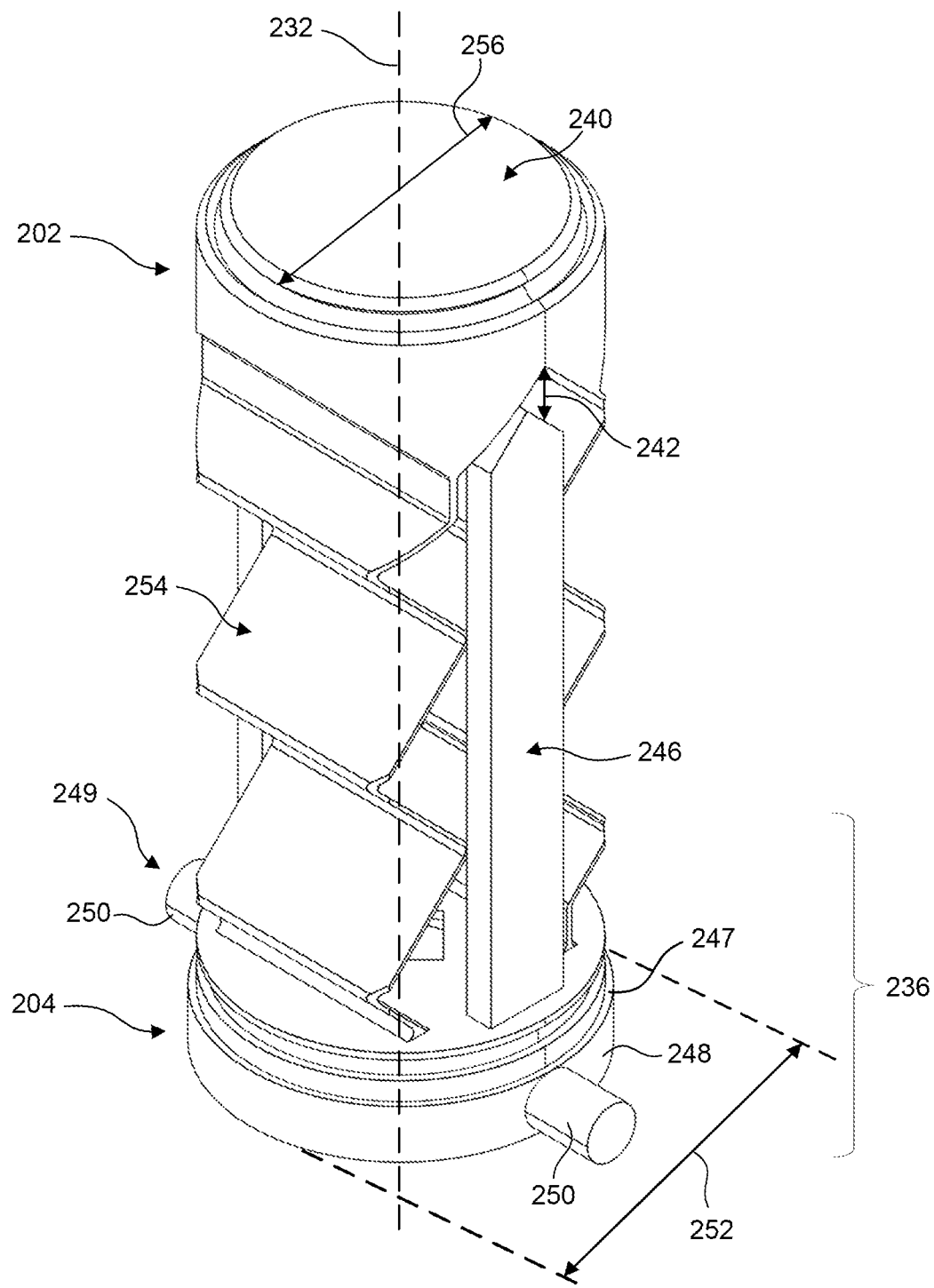
FIG. 2 illustrates a perspective view of a poppet-carrying portion of a valve assembly, according to an embodiment of the present disclosure.

FIG. 2 illustrates a perspective view of a poppet-carrying portion 200 of a valve assembly, according to some embodiments. Poppet-carrying portion 200 provides a checking mechanism for preventing or limiting the flow of fluid in a particular direction until a threshold fluid pressure (e.g., cracking pressure) is reached, as explained in greater detail below with respect to the features of poppet-carrying portion 200. The inventors realized and discovered the geometry and structure of poppet-carrying portion 200 as enabling the checking mechanism without requiring as many parts as a conventional check valve or poppet valve, and as an integrally formed part that can be produced using LPBF. For example, rather than requiring a separate shaft and spring assembly for keeping the poppet seated and for moving between seated and unseated positions, the printed form and structure of poppet-carrying portion 200 provides a natural pre-load as an integral structure. Additionally, the inventors realized and discovered that the configured engagement of poppet-carrying portion 200 with housing 100 eliminated the need for custom tooling and time-intensive manufacturing processes to achieve the required pre-loading mechanism. For example, the inventors realized and discovered the helical grooves 124 of housing 100 as geometry capable of being produced using LPBF and realized and discovered the configured engagement of protruding arms 250 with assembly portion 130 as enabling a high pre-load as a function of its shape and form alone. Thus, the inventors realized and discovered a pre-loading mechanism that does not require custom pre-loading equipment or extensive labor to achieve high pre-loads.

Poppet-carrying portion 200 may comprise poppet head 240, one or more convolutions 254, one or more stopping portions 246, and a closure 236. The closure 236 may be disposed at a second end 204 of poppet-carrying portion 200 and comprise a poppet-carrying portion support 248 and a mating portion 249. Mating portion 249 may be configured to engage assembly portion 130 of housing 100. In the illustrative embodiment, mating portion 249 includes two protruding arms 250 extending outwardly away from poppet-carrying portion support 248 and configured to insert into helical grooves 124 of assembly portion 130 of housing 100. In some embodiments, mating portion 249 includes two protruding arms 250 disposed on opposite sides of poppet-carrying portion support 248. In some embodiments, mating portion 249 includes more than two protruding arms 250 circumferentially spaced around poppet-carrying portion support 248. In some embodiments, mating portion 249 may include helical grooves and assembly portion 130 of housing 100 may include inward facing protrusions configured to engage the helical grooves. Poppet-carrying portion 200 may be integrally formed using additive manufacturing.

Convolutions 254 may extend between poppet head 240 and poppet-carrying portion support 248 of poppet-carrying portion 200 along the longitudinal axis 232 as shown, for example, in FIG. 2. In some embodiments, convolutions 254 may be configured to bias along the longitudinal axis 232 and be flexible, allowing poppet head 240 to move along longitudinal axis 232 relative to poppet-carrying portion support 248. For example, convolutions 254 may be compressible and exert a force away from poppet-carrying portion support 248. In one embodiment, convolutions 254 may form a concertinaed structure. In one embodiment, convolutions 254 may comprise a spring.

Convolutions 254 may be selected to have a pattern that allows for even force distribution between the convolutions 254 as shown, for example, in FIG. 2. In some embodiments, poppet-carrying portion 200 may include only one convolution 254. For example, convolution 254 may extend between poppet-carrying portion support 248 and poppet head 240 along the diameters of the two components and parallel to longitudinal axis 232. This configuration may allow for fluid pressure applied on poppet head 240 to be evenly applied along the width of the single convolution 254.

As shown, for example, in FIG. 2, poppet-carrying portion 200 may include two convolutions 254 such that the two convolutions 254 extend parallel to one another between poppet head 240 and poppet-carrying portion support 248. In some embodiments, poppet-carrying portion 200 may comprise more than two convolutions 254. For example, the convolutions 254 may be between poppet-carrying portion support 248 and poppet head 240, with the convolutions being circumferentially spaced around longitudinal axis 232 and the circumference of poppet-carrying portion support 248.

Additionally, in some embodiments where poppet-carrying portion 200 comprises two or more convolutions 254, the number of stopping portions 246 in poppet-carrying portion 200 may be equal to the number of convolutions 254. Stopping portions 246 may be positioned equidistant to each other around the circumference of poppet-carrying portion support 248 with a stopping portion 246 between each pair of convolutions 254, such that poppet-carrying portion 200 is radially symmetrical, as shown, for example, in FIG. 2.

Poppet head 240 may be disposed at a first end 202 of poppet-carrying portion 200 and extend circumferentially around longitudinal axis 232 and form a disk having a diameter 256. Poppet head diameter 256 may have a value less than or equal to diameter 128 of valve chamber 126 and be greater than the internal diameter of inlet port 110. In the illustrative example shown in FIG. 2, poppet head 240 is a cylinder extending along longitudinal axis 232. Poppet head 240 may include a groove formed in an outer radial surface of poppet head 240 and configured to house a seal or an o-ring to seal against an inner wall of valve chamber 126 (not shown in FIG. 2). In some embodiments, poppet head 240 may include a cylinder portion and a cone portion configured to seal and engage against an inner surface of valve chamber 126 and an inner surface of angled wall portion 112. Poppet head 240 may include grooves formed in the cylinder, the cone portion (shown, for example, in FIGS. 2 and 3), or both the cylinder and cone portions (shown, for example, in FIG. 5), where the grooves are configured house a seal or o-rings to seal against an inner wall of valve chamber 126 and/or an inner wall of angled wall portion 112.

Poppet-carrying portion support 248 may extend circumferentially around longitudinal axis 232 and form a disk having a diameter 252. Poppet-carrying portion support 248 may provide support to the poppet-carrying portion 200 from underneath the one or more convolutions 254. Poppet-carrying portion support 248 may be approximately parallel to poppet head 240. In some embodiments, poppet-carrying portion support 248 may be a hollow disk and may comprise an opening at its center (not shown in FIG. 2). In some embodiments, the opening in poppet-carrying portion support 248 may have a diameter equal to that of inlet port 110. In the illustrative example shown in FIG. 2, poppet-carrying portion support 248 may include a groove 247 formed in an outer radial surface of poppet-carrying portion support 248 and configured to house a seal or an o-ring to seal against an inner wall of valve chamber 126.

In the illustrative example shown in FIG. 2, protruding arms 250 can extend radially outward from the side of poppet-carrying portion support 248. As shown, for example, in FIG. 2, there are two protruding arms 250 that extend from opposite points along the side of poppet-carrying portion support 248, such that protruding arms 250 are coaxial on opposite sides of poppet-carrying portion support 248. In other embodiments, poppet-carrying portion 200 may comprise more than two protruding arms 250. The number of protruding arms 250 is equal to the number of helical grooves 124 in assembly portion 130 of housing 100. Protruding arms 250 may be cylindrical, having equal length and diameter. The diameter of protruding arms 250 may be equal to the width 122 of helical grooves 124. Protruding arms 250 may be positioned at equidistant points around the circumference of poppet-carrying portion support 248. During assembly of the valve assembly, poppet-carrying portion 200 may be inserted and rotated into valve chamber 126 of housing 100 such that protruding arms 250 slide into helical grooves 124 and lock poppet-carrying portion 200 into housing 100.

Stopping portions 246 extend upward from poppet-carrying portion support 248 toward poppet head 240 and parallel to longitudinal axis 232. Poppet-carrying portion 200 may include two or more stopping portions of equal length and width. In some embodiments, poppet-carrying portion 200 may include a single stopping portion 246. The length of stopping portions 246 is equal to the distance between the bottom of poppet head 240 and the top of poppet-carrying portion support 248 minus the length of maximum compression distance 242 as shown, for example, in FIG. 2. Similar to protruding arms 250, stopping portions 246 may be positioned circumferentially equidistant to each other around the circular top edge of poppet-carrying portion support 248. In the illustrative embodiment shown in FIG. 2, stopping portions 246 may include a formed top that corresponds in shape and aligns with a corresponding recess formed in the poppet head 240. In some embodiments, the formed top of stopping portions 246 may have triangular, domed, or other suitable shape.

Figure 3:
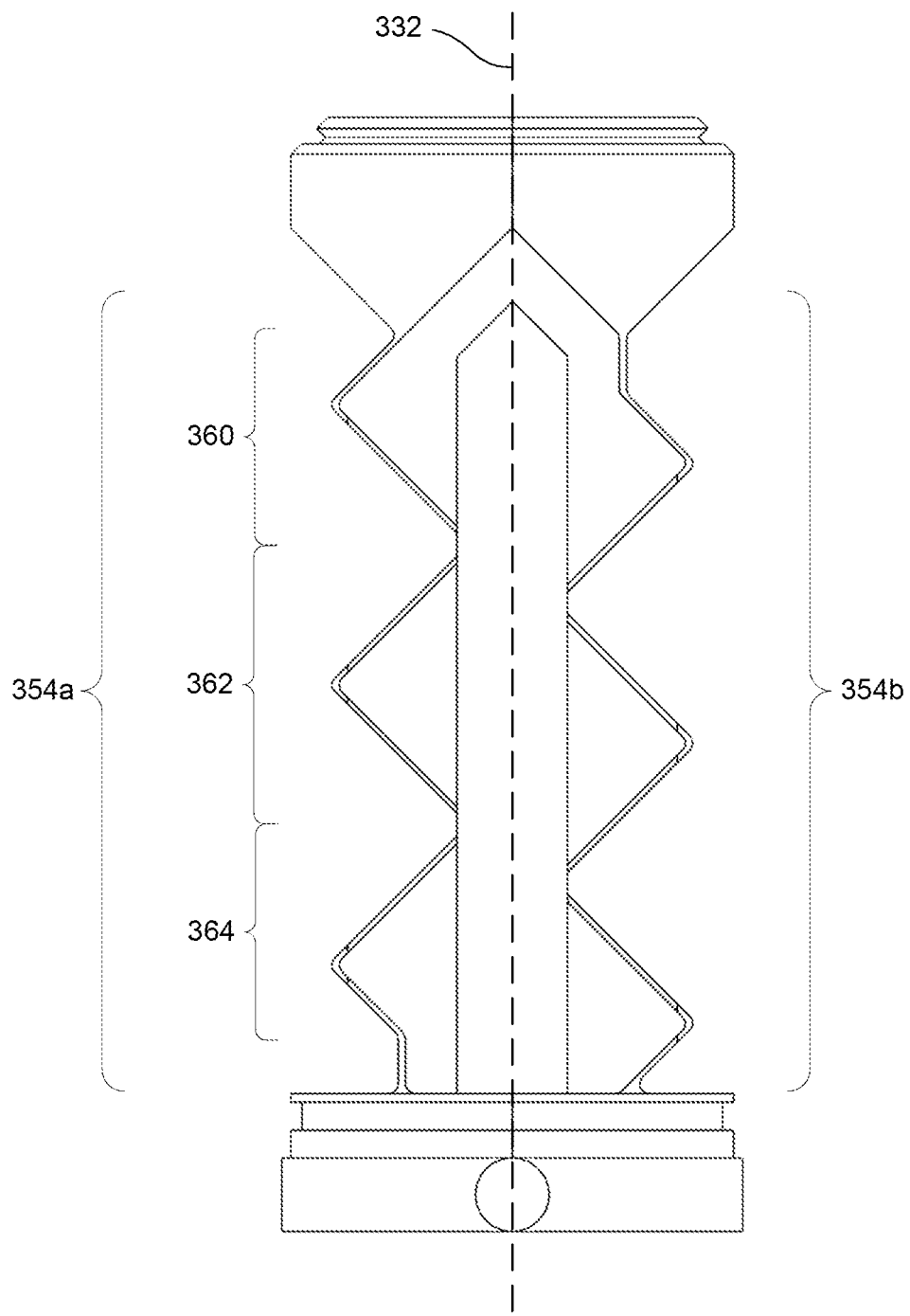
FIG. 3 shows a side view of the poppet-carrying portion of FIG. 2, showing two parallel convolutions, according to an embodiment of the present disclosure.

FIG. 3 shows a side view of a poppet-carrying portion 300 including two parallel convolutions 354a and 354b, according to an embodiment. As shown in FIG. 3, poppet-carrying portion 300 may comprise parallel convolutions 354a and 354b.

In some embodiments, convolution 354a may comprise one or more individual subconvolutions 360, 362, 364. In the illustrative embodiment shown in FIG. 3, convolution 354a includes three subconvolutions 360, 362, and 364. The number of subconvolutions per convolution 354a may be increased to reduce the horizontal displacement of each convolution when under compression.

Figure 4:
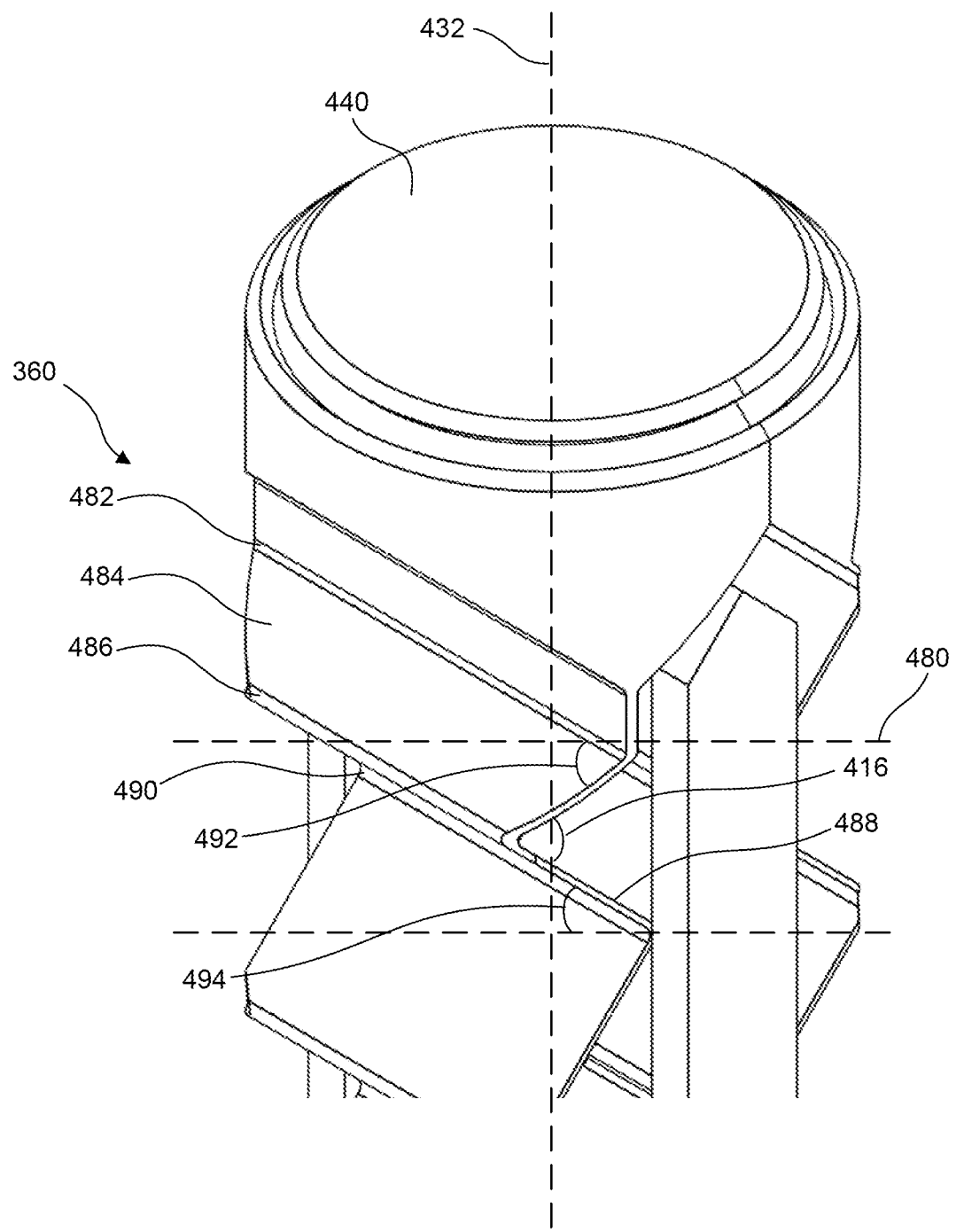
FIG. 4 illustrates a detailed perspective view of a convolution, according to an embodiment of the present disclosure.

FIG. 4 illustrates a detailed view of subconvolution 360 shown in FIG. 3, according to some embodiments. The subconvolution 360 forms a concertinaed structure, such that it may extend, compress, or collapse as a fold. Subconvolution 360 may comprise a first end 482, a first compliant portion 484, a second compliant portion 486, a third compliant portion 488, and a second end 490. First end 482 may be coupled with poppet head 440 such that convolution 360 extends from poppet head 440 towards poppet-carrying portion support 248. First compliant portion 484 may extend outwardly away from longitudinal axis 432 and first end 482 at a first angle 492 relative to lateral axis 480 (not shown in the detail of FIG. 4). Lateral axis 480 may be perpendicular to longitudinal axis 432. First angle 492 may be between about 30 degrees and about 80 degrees. Second compliant portion 486 may extend from a distal end of first compliant portion 484 and couple to a proximal end of third compliant portion 488. Third compliant portion 488 may extend inward toward the longitudinal axis 432 and second end 490 at a second angle 494 relative to lateral axis 480. Second angle 494 may be between about 30 degrees and about 80 degrees.

In some embodiments, first angle 492 and second angle 494 may be equal, as shown, for example in FIG. 4. First compliant portion 484 and third compliant portion 488 may be coupled at second compliant portion 486 at a third angle 416. Third angle 416 may be equal to the sum of first angle 492 and second angle 494. When subconvolution 360 is under compression, first angle 492, second angle 494, and third angle 416 may decrease such that the distance between first end 482 and second end 490 along the longitudinal axis 432 decreases.

In some embodiments, referring again to FIG. 3, the configurations of subconvolutions 362 and 364 of convolution 354a may be substantially similar to subconvolution 360. In some embodiments where convolution 354a comprises multiple subconvolutions, all the subconvolutions of convolution 354a may have the same or substantially the same dimensions and configuration. In some embodiments, where poppet-carrying portion 300 comprises a first convolution 354a and a second convolution 354b, first convolution 354a and second convolution 354b may be configured to be translationally symmetrical across longitudinal axis 332. In some embodiments, first convolution 354a and second convolution 354b may be bilaterally symmetrical.

Figure 5:
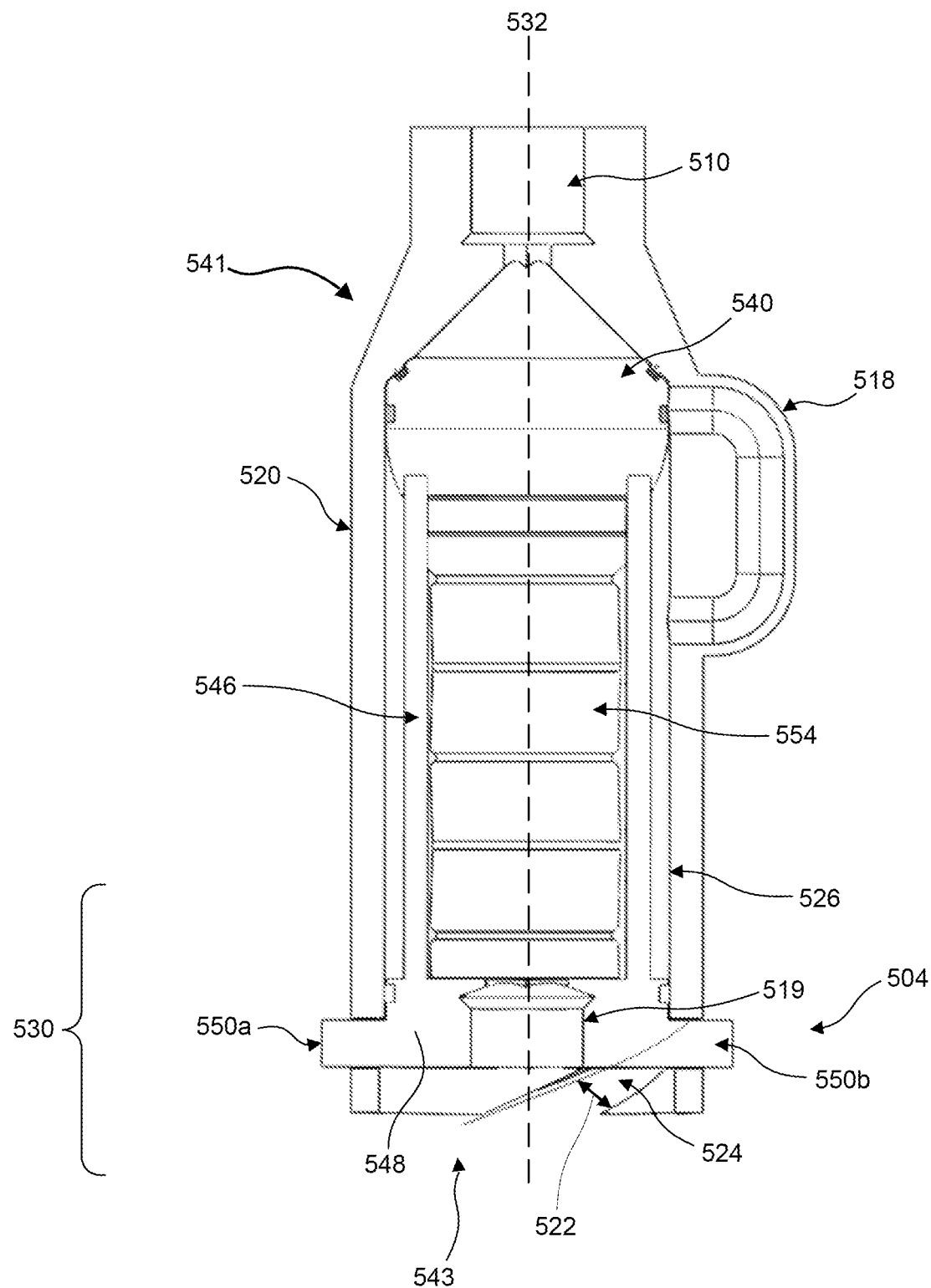
FIG. 5 illustrates a cross-sectional side view of a valve assembly with a housing configuration comprising a C-shaped outlet port that feeds back into the valve chamber, according to an embodiment of the present disclosure.

FIG. 5 illustrates a cross-sectional side view of valve assembly 500, according to some embodiments. Valve assembly 500 may comprise housing 541 and poppet-carrying portion 543. Housing 541 may include a C-shaped outlet port 518 that feeds back into the valve chamber 526. Housing 541 may be configured similarly to housing 100 illustrated in FIG. 1 and include the same or substantially the same components as described above. As shown, for example, in FIG. 1, outlet port 118 of housing 100 may extend from housing wall 120 perpendicular to longitudinal axis 132 and include an opening located distally from housing wall 120 from which fluid may be discharged. Outlet port 518 of housing 541 also extends from housing wall 520 perpendicular to longitudinal axis 532. Unlike outlet port 118, however, outlet port 518 may not include an opening. Outlet port 518 may instead form a C-shaped tube such that the distal end of outlet port 518 also extends from housing wall 520. This configuration allows discharged fluid to flow around poppet head 540 and back into valve chamber 526 of housing 541 instead of flowing outside of valve assembly 500.

As noted above, poppet-carrying portion 543 may be configured to be located inside housing 541 such that poppet-carrying portion 543 sits inside valve chamber 526. Poppet-carrying portion 543 may lock into assembly portion 530 of housing 541 such that protruding arms 550a and 550b of poppet-carrying portion 543 insert into helical grooves 524 of housing 541.

In the illustrative embodiment shown in FIG. 5, poppet-carrying portion 543 comprises two protruding arms 550a and 550b. The number of protruding arms 550a, 550b may be equal to the number of helical grooves 524 in corresponding housing 541. Protruding arms 550a, 550b may be cylindrical having equal length and diameter. The diameter of protruding arms 550a, 550b is equal to the width 522 of helical grooves 524. Additionally, protruding arms 550a and 550b may be positioned at equidistant points around the circumference of poppet-carrying portion support 548. Similarly, helical grooves 524 may be cut or formed into housing wall 520 at equidistant positions around the circumference of housing wall 520 at the second end 504 of housing 541.

During assembly of valve assembly 500, poppet-carrying portion 543 may be inserted into housing 541 such that protruding arms 550a and 550b slide into helical grooves 524 and lock poppet-carrying portion 543 into housing 541. Once valve assembly 500 is assembled, but not yet under sufficient fluid pressure to compress convolutions 554, poppet head 540 may be located in housing 541 such that it sits below inlet port 510 and blocks the internal opening of outlet port 518 such that fluid cannot be discharged through outlet port 518, as shown, for example, in FIG. 5.

Fluid may flow into valve assembly 500 via inlet port 510 and apply force to poppet head 540. As the fluid pressure applied to poppet head 540 builds, convolutions 554 may compress such that poppet head 540 is displaced along longitudinal axis 532 and toward poppet-carrying portion support 548. The displacement of poppet head 540 exposes the internal opening of outlet port 518 so that it is no longer blocked, allowing fluid to flow through outlet port 518. In the embodiment illustrated in FIG. 5, the fluid flows through outlet port 518 and into valve chamber 526 such that it is discharged via an opening 519 in poppet-carrying portion support 548. In illustrative embodiment shown in FIG. 1, the outlet port 118 may be coupled with another component such that fluid flows out of the outlet port and is received coupled component.

A maximum displacement distance of poppet head 540 may be reached when poppet head 540 contacts stopping portions 546. Once the fluid pressure applied on poppet head 540 has caused sufficient compression of convolutions 554 such that poppet head 540 is pressing down against stopping portions 546, the maximum allowable displacement has been reached and poppet head 540 may not be displaced further.

In the embodiment of FIG. 5, the poppet head 540 and convolutions 554 are initially energized in a closed state so that the poppet head 540 can provide sufficient force to seal the valve assembly 500. The helical grooves 524 corresponding to the protruding arms 550a, 550b provide that energization. During assembly, housing 541 is rotated or twisted relative to poppet-carrying portion 543, so that protruding arms 550a, 550b follow the ramp of helical grooves 524, applying pressure to and compressing convolutions 554 from the housing 541. Compressing convolutions 554 into housing 541 provides a pre-load sufficient to keep convolutions 554 energized in a normally closed state of valve assembly 500.

The pre-load enables passive valve actuation that is operated by increased pressure. When flow enters inlet port 510, pressure increases in the cavity above poppet head 540. At a sufficient pressure, poppet head 540 will compress the convolutions 554 to a threshold distance. In some embodiments, the threshold distance is configured as a maximum distance that is set by the position of stopping portions 546. At the maximum distance, the poppet head 540 is unseated so that flow can move from inlet port 510 through outlet port 518 and out through the bottom of valve assembly 500. Once that happens, a low-pressure zone on the back side of poppet head 540, caused by fluid mechanics, will further urge the poppet head 540 to remain unseated, facilitating flow through valve assembly 500. As noted in the Background, an off-the-shelf check valve will have, on average, seven to nine individual components, for example including a bonnet cover, a valve body, a hinge and hinge pin, a disc, a seat, and a seal, which the inventors realized and discovered could be omitted in the valve assembly 500 as a result of its form and printed structure. The embodiment of FIG. 5 provides a substantial part count reduction with no loss of performance versus such an off-the-shelf valve check valve.

Example Reverse Check Valve Embodiments

Figure 6:
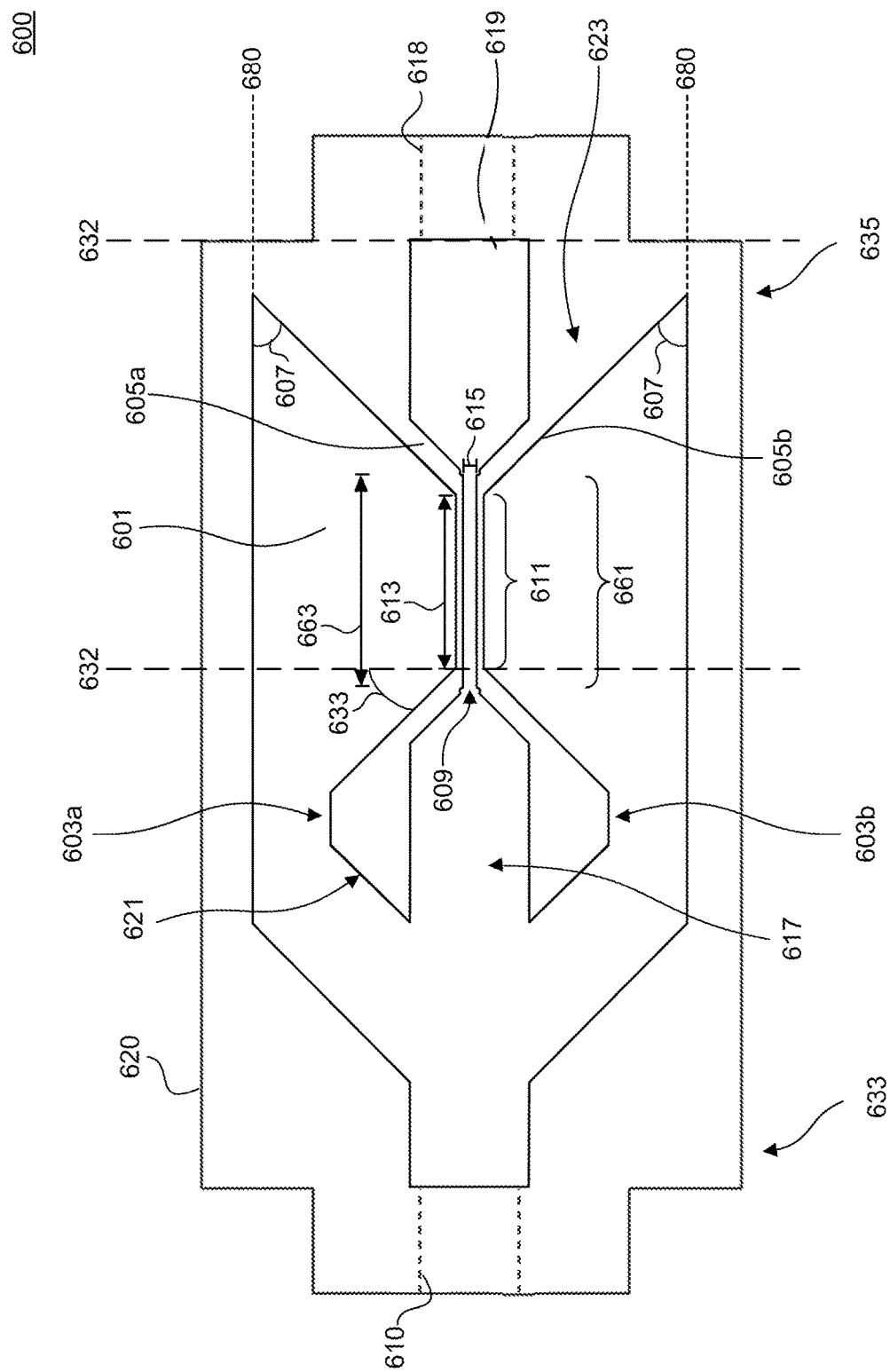
FIG. 6 illustrates a cross-sectional view of a reverse check valve, according to an embodiment of the present disclosure.

FIG. 6 illustrates a cross-sectional view of reverse check valve 600, according to some embodiments. Reverse check valve 600 (also referred to herein as "valve 600") may comprise valve wall 620, inlet port 610 located at an inlet end 633, outlet port 618 located at an outlet end 635, and compliance beams 603a, 603b. The valve wall 620 extends from the inlet end 633 to the outlet end 635 and encloses a space between the inlet port 610 and the outlet port 618 to form a valve cavity 601. The valve cavity 601 is configured to receive fluid that enters the valve 600 through the inlet port 610. The compliance beams 603a, 603b extend from the outlet end 635 into the valve cavity 601 and are configured to be spaced apart to form a flow path 609 from the inlet port 610 to the outlet port 618. The inventors realized and discovered that the structure of reverse check valve 600 could be integrally formed using additive manufacturing methods, namely LPBF. For example, the compliance beams 603a, 603b may be integral with the valve wall 620 and the outlet end 635 of the valve 600, forming a single and continuous integral piece. As shown, for example, in FIG. 6, reverse check valve 600 includes geometry components, such as overhangs, that could not be properly formed using traditional manufacturing methods.

Each of compliance beams 603a, 603b comprise a first end 621 located near inlet end 633 and spaced apart from the inlet port 610, which form an inlet cavity 617 of the flow path 609, and a second end 623 located at the outlet port 618, to form an outlet cavity 619 of the flow path 609. Each of the compliance beams 603a and 603b further comprise a valve neck 611 connecting the first end 621 and the second end 623 and extending further inward into the valve cavity 601 to form a throat section 661 of the flow path. The throat section is configured to have a length 663 and a width 615. Forming a substantial portion around the throat section 661 is valve neck 611, which has a length 613. During operation, fluid is configured to pass through the flow path 609 by converging into the throat section 661 from the inlet cavity 617, passing through the throat section 661, diverging out of the throat section 661 into the outlet cavity 619, and out through the outlet port 618. As the total fluid pressure inside of valve 600 builds and velocity of the fluid passing through the flow path 609 increases, the width 615 of the flow path reduces and eventually seals and closes off the flow path 609, as described in greater detail below.

Outlet cavity walls 605a, 605b may extend diagonally inward from the inner corners of the outlet side of valve wall 620 towards valve neck 611 at a first angle 607 relative to lateral axis 680. First angle 607 may be between about 30 degrees and about 80 degrees. Outlet cavity walls 605a, 605b may extend inward at first angle 607 until the distance between upper outlet cavity wall 605a and lower outlet cavity wall 605b is equal to width 615.

Compliance beams 603a, 603b may extend from upper outlet cavity wall 605a and lower outlet cavity wall 605b respectively. Compliance beams 603a, 603b may each extend parallel to lateral axis 680. Compliance beams 603a, 603b may then each extend away from the other and toward valve wall 620 at a second angle 633 relative to longitudinal axis 632. Second angle 633 may be between about 10 degrees and about 60 degrees. As shown in FIG. 6, compliance beams 603a, 603b may terminate in trapezoidal shapes such that the compliance beams 603a, 603b are symmetrical across lateral axis 680.

In the illustrative embodiment shown in FIG. 6, compliance beams 603a, 603b may be configured to be cantilever beams fixed to valve 600 at second end 623 while the other end 621 is free floating. The fulcrum of compliance beam 603a may be located at the start of the beam where the portion of compliance beam 603a forming the upper wall of throat section 661 meets upper outlet cavity wall 605a. Similarly, the fulcrum of compliance beam 603b may be located at the joint where the portion of compliance beam 603b forming the lower wall of throat section 661 meets lower outlet cavity wall 605b.

As shown, for example, in FIG. 6, the thickness of compliance beams 603a, 603b may vary across the length of the beams. For example, in the embodiment illustrated in FIG. 6, the thickness of compliance beam 603a is significantly greater at its free floating, trapezoidal first end 621 than a thickness at the portion of compliance beam 603a forming the upper wall of valve neck 611. As noted above, in the illustrative embodiment shown in FIG. 6, compliance beams 603a, 603b are symmetrical across lateral axis 680 and thus compliance beam 603b may similarly have a significantly greater thickness at its free floating, trapezoidal end than at the section forming the lower wall of valve neck 611.

In the embodiment illustrated in FIG. 6, fluid may flow into valve 600 via inlet port 610 and out via outlet port 618. Fluid entering valve 600 via inlet port 610 may flow into valve cavity 601, along the flow path 609, passing through the throat section 661, and then into outlet cavity 619, and finally out of valve 600 via outlet port 618. Fluid flow though flow path 609 may follow Bernoulli's principle such that as the fluid velocity increases, the static pressure in flow path 609 will decrease.

For example, fluid may flow into valve 600 via inlet port 610 at a first velocity $V_1$. The fluid flow may fill valve cavity 601 such that the static pressure in valve cavity 601 is equal to a first pressure $P_1$. As the fluid flows through throat section 661, the velocity of fluid may increase to a second velocity $V_2$ as a function of throat section length 663 and width 615. Due to Bernoulli's principle, the increase in fluid velocity in the throat section may cause the static pressure in the throat section 661 to decrease to a second pressure $P_2$ such that first pressure $P_1$ is greater than second pressure $P_2$. The resulting difference in pressure between valve cavity 601 and the throat section 661 may cause compliance beams 603a and 603b to be pulled toward each other such that the upper and lower walls of valve neck 611 throat section 661 come together and fluid flow through flow path 609 is choked and/or blocked. Once the walls of throat section 661 come together to close flow path 609, the force applied to compliance beams 603a and 603b by the pressure in valve cavity 601 is sufficient to keep the walls of throat section 661 together and thus keep flow path 609 closed.

Figure 7:
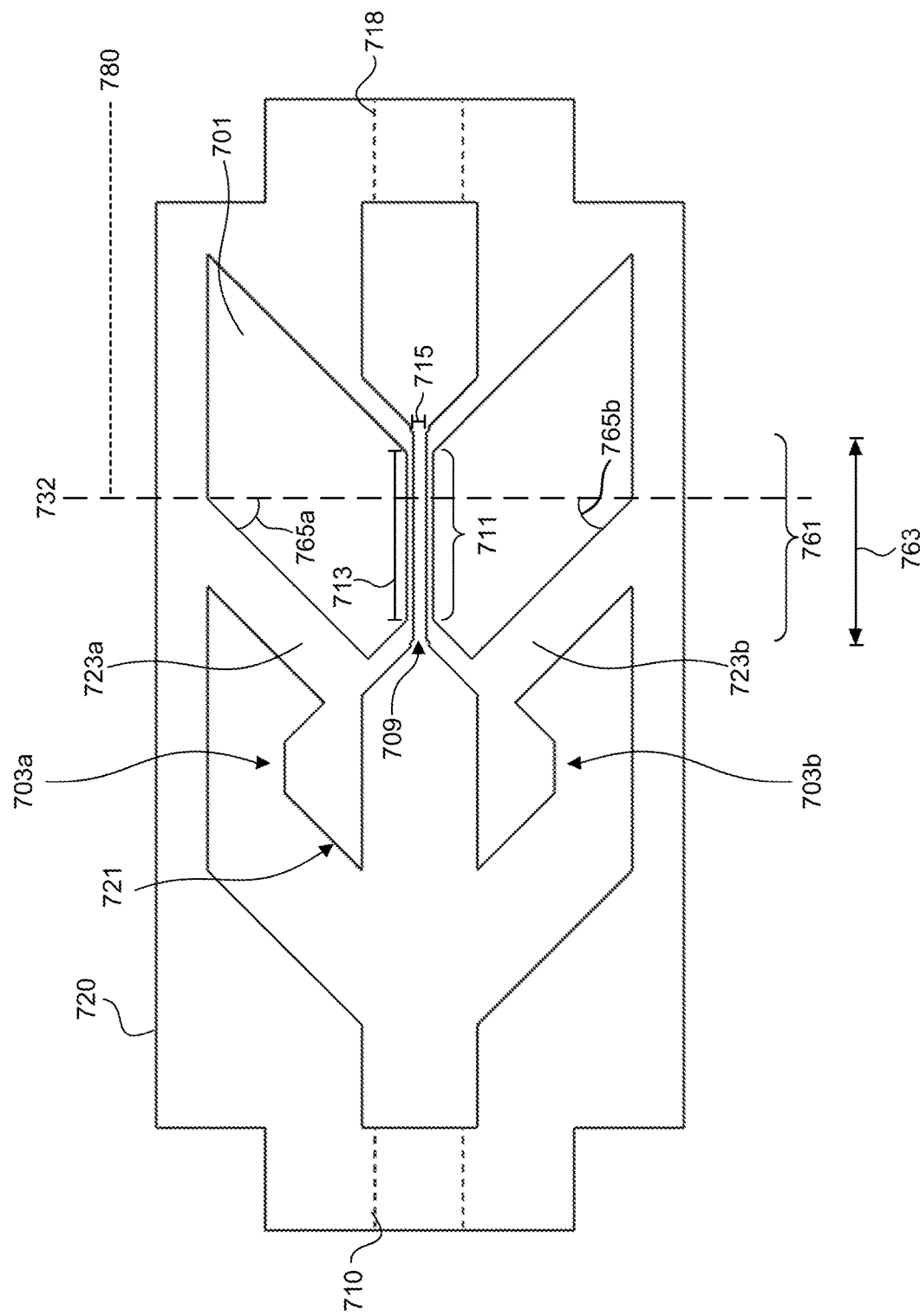
FIG. 7 illustrates a cross-sectional view of a reverse check valve, according to an embodiment of the present disclosure.

FIG. 7 illustrates a cross-sectional view of a reverse check valve 700 with a second configuration of compliance beams 703a, 703b, according to some embodiments. Reverse check valve 700 may comprise valve wall 720, inlet port 710, outlet port 718, valve cavity 701, compliance beams 703a, 703b, flow path 709, throat section 761, and support beams 723a and 723b. Similar to reverse check valve 600, the compliance beams 703a, 703b of reverse check valve 700 may extend from the upper and lower walls of an outlet cavity formed between outlet port 718 and flow path 709. Compliance beams 703a, 703b may each comprise a valve neck 711 wall section and a trapezoidal end 721. Compliance beams 703a, 703b may extend parallel to lateral axis 780.

Compliance beams 703a, 703b of valve 700 may be attached to valve wall 720 by support beams 723a and 723b respectively. Support beam 723a may extend diagonally inward from valve wall 720 toward the inlet port 710 and the outlet side of the trapezoidal end 721 of compliance beam 703a at a first angle 765a relative to longitudinal axis 732. Similarly, support beam 723b may extend inward from valve wall 720 toward the inlet port 710 and the outlet side of the trapezoidal end of compliance beam 703b at a second angle 765b relative to longitudinal axis 732. First angle 765a and second angle 765b may each be between about 30 degrees and about 80 degrees. In some embodiments, first angle 765a and second angle 765b may be equal.

In the embodiment illustrated in FIG. 7, fluid may flow into valve 700 via inlet port 710 may flow into valve cavity 701 and flow path 709. Similarly to fluid flow in valve 600, fluid flow though flow path 709 may follow Bernoulli's principle such that as the fluid velocity increases, the static pressure in flow path 709 will decrease. However, in an embodiment with support beams 723a and 723b, compliance beams 703a, 703b are each attached to valve wall 720 at two different points and thus no longer behave as cantilever beams. As such, the walls of throat section 761 will not be able to seal so that the full surface areas of the valve neck sections of compliance beams 703a, 703b are spaced apart and not in contact.

Applying the example described above to reverse check valve 700, fluid may flow into valve 700 via inlet port 710 at a first velocity $V_1$. The fluid flow may fill valve cavity 701 such that the static pressure in valve cavity 701 is equal to a first pressure $P_1$. As the fluid flows through flow path 709, the velocity of fluid may increase to a second velocity $V_2$ as a function of throat section length 763 and flow path width 715. Similar to valve 600, the increase in fluid velocity causes the static pressure in the throat section to decrease to a second pressure $P_2$, such that first pressure $P_1$ is greater than second pressure $P_2$. This arrangement may cause the pressure in flow path 709 to decrease to a second pressure $P_2$ such that first pressure $P_1$ is greater than second pressure $P_2$. However, unlike compliance beams 603a, 603b of valve 600, compliance beams 703a, 703b do not have a free-floating end and thus the walls of throat section 761 cannot close such that the full surface areas of the walls of throat section 761 come into contact with each other. Instead, the difference in pressure between valve cavity 701 and flow path 709, if sufficient, may cause the walls of valve neck 711 to warp and bend inward such that they meet in the middle to block fluid flow in flow path 709.

In the embodiment illustrated in FIG. 7, support beams 723a and 723b increase the stiffness of compliance beams 703a, 703b. As such, in order to for compliance beams 703a, 703b to provide the necessary compliance to close fluid path 709 under the same conditions as valve 600, valve neck length 713 needs to be greater than throat section length 663 of valve 600. Specifically, valve neck length 713 must be approximately three times throat section length 663 in order for flow path 709 to close under the same conditions as flow path 609 of valve 600.

Figure 8:
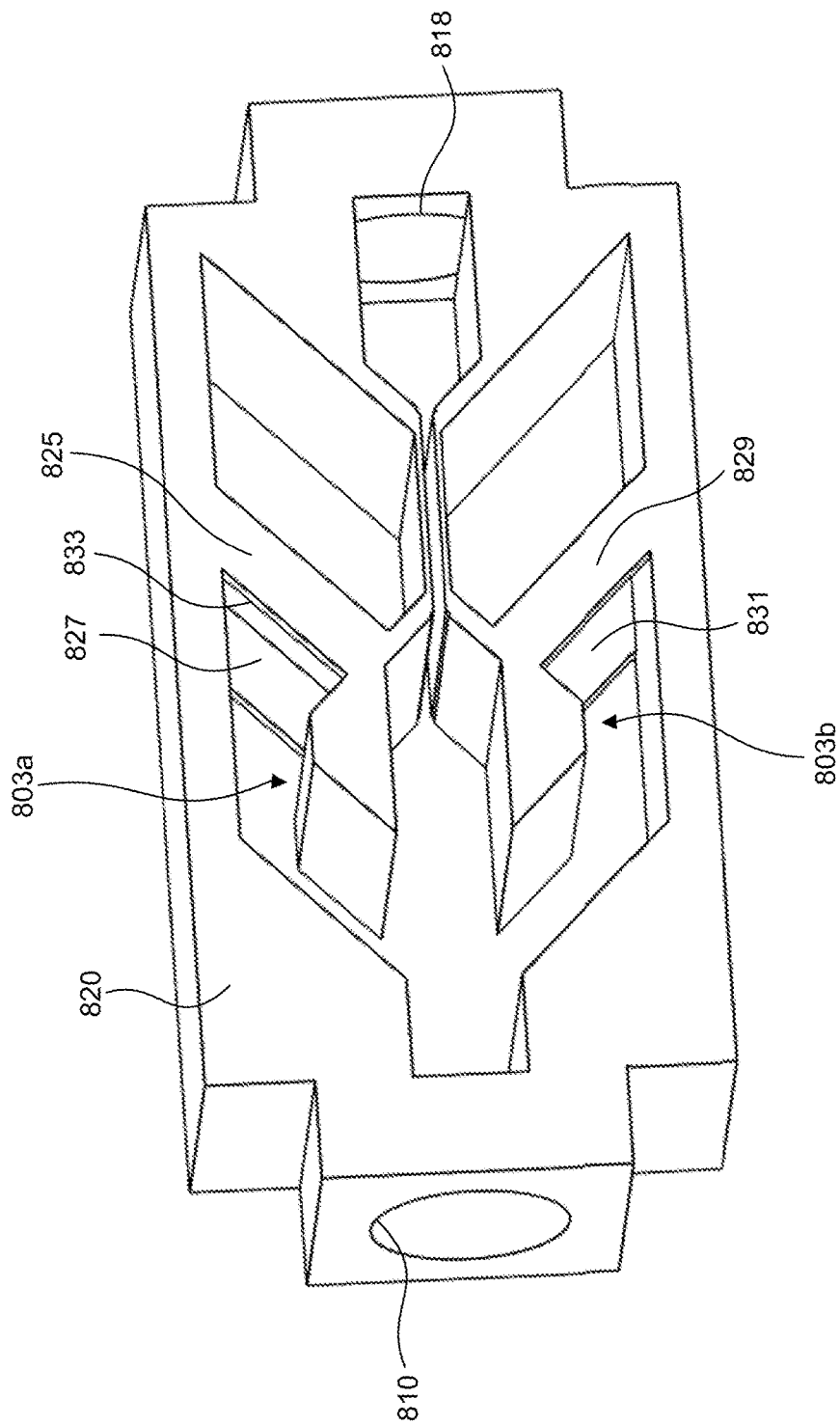
FIG. 8 illustrates a perspective view of the reverse check valve of FIG. 7, according to an embodiment of the present disclosure.

FIG. 8 illustrates a perspective view of the reverse check valve according to an embodiment similar to FIG. 7. Reverse check valve 700 may comprise support beams 825, 827, 829, 831. Support beams 825, 827 may attach compliance beam 803a to valve wall 820. Similarly, support beams 829, 831 may attach compliance beam 803b to valve wall 820. Support beams 825, 827, 829, 831 may have support beam thickness 833.

As shown in FIG. 8, support beams 825, 827 may attach to valve wall 820 such that the upper surfaces of both support beams 825, 827 are flush with the upper surface of valve wall 820. Similarly, support beams 829, 831 may attach to valve wall 820 such that the lower surfaces of both support beams 829, 831 are flush with the lower surface of valve wall 820. Support beams 825, 829 may be parallel to and spaced apart from support beams 827, 831 respectively. The distance between support beam 825, 829 may be equal to the height of valve 800 minus two times support beam thickness 833. Similarly, the distance between support beam 827, 831 may be equal to the height of valve 700 minus two times support beam thickness 833.

The reverse check valve embodiments discussed above provide a significant advantage over existing reverse check valves on the market that provide similar functionality. Similar to an off-the-shelf check valve, an off-the-shelf reverse check valve will have several individual components. In contrast, one embodiment of the reverse check valve described is integrally formed and thus only have one part. The inventors realized and discovered that the reverse check valve embodiments described above provide a substantial part count reduction with no loss of performance in comparison to an off-the-valve check valve with similar functionality.

CONCLUSION

It is to be appreciated that the Detailed Description section, and not any other section, is intended to be used to interpret the claims. Other sections can set forth one or more but not all embodiments as contemplated by the inventors, and thus, are not intended to limit this disclosure or the appended claims in any way.

While this disclosure describes example embodiments for example fields and applications, it should be understood that the disclosure is not limited thereto. Other embodiments and modifications thereto are possible and are within the scope and spirit of this disclosure. For example, and without limiting the generality of this paragraph, embodiments are not limited to the hardware and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different from those described herein.

References herein to "an embodiment," "some embodiments," "an example," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art to incorporate such feature, structure, or characteristic into other embodiment whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described embodiments, which are merely examples, but should be defined only in accordance with the following claims and their equivalents.

What is claimed is:

1. A valve assembly comprising:
a housing comprising:
an inlet port, at a first end of the housing, configured to receive a fluid;
an outlet port, spaced from and substantially perpendicular to the inlet port, configured to discharge the fluid; and
an assembly portion, at a second end of the housing distal from the inlet port, the assembly portion comprising an opening and helical grooves around the opening; and
a poppet-carrying portion configured to be inserted through the opening of the assembly portion, the poppet-carrying portion comprising:
a poppet head, at a first end of the poppet-carrying portion, configured to fit within the housing;
a closure, at a second end of the poppet-carrying portion, comprising protruding arms;
at least one convolution extending between the poppet head and the closure, configured to allow the poppet head to compress and extend relative to the closure; and
a stopping portion, extending from the closure toward the poppet head and spaced apart from the poppet head by a maximum compression distance, the stopping portion configured to limit compression of the at least one convolution to the maximum compression distance;
wherein, at a first fluid pressure, the protruding arms engage with the helical grooves, and the poppet head is positioned in a pre-load position that prevents the fluid from discharging through the outlet port.

2. The valve assembly of claim 1, wherein the at least one convolution is configured to compress a threshold distance at a second fluid pressure greater than the first fluid pressure, and wherein at the threshold distance the poppet head is configured to move from the pre-load position to an unseated position that allows the fluid to discharge through the outlet port.

3. The valve assembly of claim 1, wherein the at least one convolution comprises a spring.

4. The valve assembly of claim 1, wherein the at least one convolution comprises a concertinaed structure.

5. The valve assembly of claim 4, wherein the concertinaed structure comprises:
a first end;
a second end;
a longitudinal axis extending from the first end to the second end;
a first compliant portion extending outwardly away from the first end at a first angle relative to the axis;
a second compliant portion; and
a third compliant portion extending outwardly away from the second end at a second angle relative to the longitudinal axis, wherein the second compliant portion is between and couples to distal ends of the first compliant portion and the third compliant portion.

6. The valve assembly of claim 5, wherein the first angle is substantially complementary to the second angle.

7. The valve assembly of claim 1, wherein the housing and the poppet-carrying portion are metal.

8. The valve assembly of claim 1, wherein the poppet head, the closure, the at least one convolution, and the stopping portion jointly form a single integral and continuous piece.

9. A valve assembly comprising:
a housing comprising:
an inlet port;
an outlet port; and
an assembly portion;

wherein the inlet port, the outlet port, and the assembly portion jointly form a first single integral and continuous piece; and a poppet-carrying portion configured to engage with the housing, the poppet-carrying portion comprising:
  a poppet head configured to move within the housing;
  a closure having a mating portion configured to engage with the assembly portion of the housing;
  a convolution extending between the poppet head and the closure, the convolution configured to provide compliance such that the poppet head moves relative to the closure; and
  a stopping portion extending from the closure toward the poppet head and spaced apart from the poppet head;
  wherein the poppet head, the closure, the convolution, and the stopping portion jointly form a second single integral and continuous piece.

10. The valve of claim 9, wherein the convolution comprises at least two structures separated from each other by a distance.

11. The valve of claim 9, wherein the inlet port is substantially perpendicular to the outlet port.

12. The valve of claim 9, wherein the assembly portion comprises a helical groove.

13. The valve of claim 9, wherein the mating portion comprises protruding arms.

14. A valve comprising:
  an inlet located at an inlet end of the valve;
  an outlet located at an outlet end of the valve;
  a valve wall extending from the inlet end to the outlet end and enclosing a space between the inlet and the outlet to form a valve cavity, the valve cavity configured to receive fluid that enters through the inlet; and
  a plurality of compliance beams extending from the outlet end into the valve cavity and spaced apart to form a flow path to the outlet, the plurality of compliance beams comprising:
    a first end located spaced apart from the inlet and forming an inlet cavity of the flow path;
    a second end located at the outlet and forming an outlet cavity of the flow path; and
    a valve neck connecting the first end and the second end to form a throat section of the flow path, the throat section having a length and a width;
    wherein fluid is configured to pass through the flow path by converging at the inlet cavity, passing through the throat section along the length of the throat section, and diverging out of the throat section at the outlet cavity; and
    wherein an increase in velocity of the fluid passing through the flow path reduces the width of the throat section.

15. The valve of claim 14, wherein the plurality of compliance beams comprises a first compliance beam and a second compliance beam, and wherein a sufficient increase in velocity of the fluid passing through the flow path causes the first compliance beam and the second compliance beam to meet at the valve neck and close the flow path.

16. The valve of claim 15, wherein the first compliance beam and the second compliance beam are symmetrical.

17. The valve of claim 14, wherein the plurality of compliance beams are integral with the valve wall.

18. The valve of claim 14, wherein the second end is integral with the outlet.

19. The valve of claim 14, wherein the first end comprises a trapezoidal shape.

20. The valve of claim 14, wherein at least one of the plurality of compliance beams is free floating at the first end.

* * * * *